United States Patent
Ewert et al.

(10) Patent No.: US 11,249,483 B2
(45) Date of Patent: Feb. 15, 2022

(54) METHOD FOR OPERATING A DRIVERLESS TRANSPORT SYSTEM

(71) Applicant: Robert Bosch GmbH, Stuttgart (DE)

(72) Inventors: Daniel Ewert, Gerlingen (DE); Frank Kawan, Wuerzburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/826,859

(22) Filed: Mar. 23, 2020

(65) Prior Publication Data

US 2020/0310440 A1    Oct. 1, 2020

(30) Foreign Application Priority Data

Mar. 29, 2019 (DE) .......................... 102019108352.4
Jun. 19, 2019 (DE) .......................... 102019208892.9

(51) Int. Cl.
*G05D 1/02* (2020.01)
*E04F 15/024* (2006.01)

(52) U.S. Cl.
CPC ..... *G05D 1/0212* (2013.01); *E04F 15/02405* (2013.01)

(58) Field of Classification Search
CPC ......... G05D 1/0212; G05D 2201/0213; G05D 1/0088; G05D 1/0236; G05D 1/0261; E04F 15/02405
See application file for complete search history.

(56) References Cited

U.S. PATENT DOCUMENTS

| | | | | |
|---|---|---|---|---|
| 5,347,456 | A * | 9/1994 | Zhang | G05D 1/0261 180/168 |
| 6,161,484 | A * | 12/2000 | Ferbeck | B62D 1/265 104/243 |
| 7,047,888 | B2 * | 5/2006 | Richards | B61B 15/00 104/27 |
| 7,755,510 | B2 * | 7/2010 | Bilimoria | G08G 1/22 340/932 |
| 7,817,064 | B2 * | 10/2010 | Nishida | G08G 1/096783 340/905 |
| 8,704,676 | B2 * | 4/2014 | Hawkes | E01F 9/559 340/815.4 |
| 9,076,339 | B2 * | 7/2015 | Hawkes | G08G 1/164 |
| 9,077,343 | B2 * | 7/2015 | Gong | H03K 17/955 |
| 10,562,529 | B2 * | 2/2020 | Moulene | B60W 30/16 |
| 10,783,779 | B1 * | 9/2020 | Meyer | G08G 1/162 |
| 10,921,815 | B2 * | 2/2021 | Bell | C09D 5/22 |
| 11,119,487 | B2 * | 9/2021 | Jarvis | B65G 1/0407 |
| 2004/0035315 | A1 * | 2/2004 | Richards | B62D 1/28 104/124 |

(Continued)

FOREIGN PATENT DOCUMENTS

DE   20 2007 017 236 U1   5/2009

*Primary Examiner* — Luis A Martinez Borrero
(74) *Attorney, Agent, or Firm* — Maginot, Moore & Beck LLP (57) ABSTRACT

A method for operating at least one intelligent floor element includes receiving at least one planned movement of at least one object on at least one floor element, determining at least one safety area for each object in its environment on at least one floor element, checking overlaps of safety areas, and outputting a signal with respect to the safety area with the aid of activatable markings on at least one floor element.

9 Claims, 4 Drawing Sheets

(56) References Cited

U.S. PATENT DOCUMENTS

| | | | | |
|---|---|---|---|---|
| 2006/0193691 | A1* | 8/2006 | Gonzalez | E01F 9/559 |
| | | | | 404/15 |
| 2007/0069021 | A1* | 3/2007 | Elrod | G06K 17/00 |
| | | | | 235/451 |
| 2011/0035140 | A1* | 2/2011 | Candy | G08G 1/052 |
| | | | | 701/119 |
| 2012/0249341 | A1* | 10/2012 | Brown | G08G 1/095 |
| | | | | 340/902 |
| 2013/0113618 | A1* | 5/2013 | Flanagan | E01F 9/559 |
| | | | | 340/539.1 |
| 2014/0232560 | A1* | 8/2014 | Hawkes | G08G 1/07 |
| | | | | 340/905 |
| 2016/0076207 | A1* | 3/2016 | Moran | G08G 1/096783 |
| | | | | 340/905 |
| 2017/0008521 | A1* | 1/2017 | Braunstein | G01C 21/3822 |
| 2017/0183832 | A1* | 6/2017 | Moran | G08G 1/0141 |
| 2017/0335526 | A1* | 11/2017 | Van Alfen | F21V 23/003 |
| 2018/0024562 | A1* | 1/2018 | Bellaiche | G06T 7/73 |
| | | | | 701/26 |
| 2019/0072976 | A1* | 3/2019 | Bell | G05D 1/0088 |
| 2019/0384294 | A1* | 12/2019 | Shashua | G05D 1/0088 |
| 2020/0152053 | A1* | 5/2020 | Rogers | G08G 1/0125 |
| 2020/0173177 | A1* | 6/2020 | Stillig | E04F 15/02405 |
| 2020/0193173 | A1* | 6/2020 | Zhang | G01C 21/30 |
| 2020/0209865 | A1* | 7/2020 | Jarvis | G06Q 10/08355 |
| 2020/0308848 | A1* | 10/2020 | Stillig | G05D 1/0234 |
| 2020/0309546 | A1* | 10/2020 | Ewert | E04F 15/024 |
| 2021/0005085 | A1* | 1/2021 | Cheng | G08G 1/0129 |
| 2021/0087756 | A1* | 3/2021 | Shah | E01F 9/582 |
| 2021/0165417 | A1* | 6/2021 | Bell | C09D 5/22 |

* cited by examiner

METHOD FOR OPERATING A DRIVERLESS TRANSPORT SYSTEM

This application claims priority under 35 U.S.C. § 119 to application no. DE 10 2019 108 352.4, filed on Mar. 29, 2019 in Germany, and to application no. DE 10 2019 208 892.9, filed on Jun. 19, 2019 in Germany, the disclosures of which are incorporated herein by reference in their entirety.

The disclosure relates to a method for operating a driverless transport system, in particular on a raised floor comprising a plurality of raised floor elements. In particular, the disclosure relates to a method for visualizing hazardous areas. Floor constructions referred to as "raised floors" are generally used in industrial buildings, in particular.

BACKGROUND

Raised floor elements for a raised floor preferably comprise an upper floor panel, a limited free space which adjoins the latter underneath, at least two functional elements (at least one functional element of which can be actuated by a control device), and at least one connecting element for the (modular) connection to at least one further raised floor element.

In the case of a raised floor, panels which are placed on supports are arranged above an existing floor or above a solid raw ceiling which can be made from concrete, for example. By way of example, reference is made to DE 20 2007 017236 U1 for further explanation of the general structure of such a raised floor. The supports predominantly have a base plate placed on the lower floor or the raw ceiling. The raised floor panels can be removed. It is easily possible to equip and retrofit the buildings with lines for communication technology and electrical power as necessary with the aid of the raised floors because the lines can be laid in the intermediate space between the floor panels and the building floor. The lines are routed out of the intermediate space through cable bushings arranged on the floor panels.

Raised floor elements are elements which can be standardized and from which such a raised floor may be constructed.

Such a raised floor element can be equipped with integrated additional functions, in particular for use in industrial environments. This has the advantage that, in addition to the actual function (providing a space which is accessible at any point below the raised floor), further additional functions are integrated. It is advantageous, in particular, that, in a structurally elegant manner, the raised floor element does not need to be moved if production is reorganized, but rather can remain at its location, and only the functions of the functional elements in or on the raised floor element need to be changed. This makes it possible to flexibly reorganize the production devices. Another particular advantage is that the amount of time and work needed to reorganize production is significantly minimized.

In this case, an upper floor panel may form a flat termination of the raised floor element and is, in particular, suitable and configured to serve as a walkway for persons, a route for vehicles and/or a set-up area for machines. The floor panel may be at least partially transparent.

In particular, a track guidance system for (driverless) vehicles (driverless transport system) can be provided here.

A track guidance system can be provided with optical sensors and may be configured for applications in the industrial environment.

Depending on the space situation and/or the number or density of travel movements on such a floor, collisions can occur and can trigger a risk for the vehicles, their conveyed material and/or the personnel.

SUMMARY

On the basis of this, the object of the present disclosure is to alleviate or even avoid the disadvantages mentioned. In particular, a method for operating a floor element is disclosed, which method enables improved track guidance. Such a floor element may be, in particular, a raised floor element of a raised floor. In addition, the intention is to specify an improved track guidance system which is configured, in particular, to operate such a floor element.

A method for operating at least one intelligent floor element is proposed here, in particular, (preferably) at least having the following steps of:

a) receiving at least one planned movement of at least one object on at least one floor element, b) determining at least one safety area for each object in its environment on at least one floor element, c) checking overlaps of safety areas, d) outputting a signal with respect to the safety area with the aid of activatable markings on at least one floor element.

The method is particularly advantageous if, in a step e) after step d), at least one planned movement is adapted if overlaps were detected in step c).

In a particularly advantageous manner, the described method is iteratively carried out in the form of a loop and the method is restarted after a planned movement has been adapted in step e).

The method can be used, in particular, when operating a driverless transport system.

A driverless transport system can move on a line applied to the floor and can therefore find its way through the area. The travel commands needed to control a driverless transport system can be transmitted in this case from a superordinate control unit to the individual driverless transport system by means of radio. The driverless transport system may be a largely independent travel controller which requires only starting and destination coordinates from a superordinate system.

The floor elements are, in particular, raised floor elements from which a raised floor can be constructed.

The raised floor is, in particular, an intelligent raised floor on which driverless transport systems can be moved, in which case this movement is controlled by the raised floor and/or with the aid of the raised floor. Driverless transport systems are also referred to below as objects which are moved on the raised floor. A further category of objects is possibly stationary objects which move, for example stationary robots.

The raised floor and the method are used, in particular, to visualize hazardous areas and trajectories of objects (mobile and stationary units).

The method can be used, in particular, to resolve priorities in the route planning and visualization of trajectories of objects on the raised floor. Trajectories are movement courses of objects on the raised floor and can also be referred to as movement trajectories or planned paths.

The raised floor and the method are used to output visual warnings when there is a risk of collisions between mobile units (objects) which are not centrally controlled on the raised floor and to thus avoid such collisions.

The "intelligent" floor may be a raised floor made of individual tiles or elements (raised floor elements) which have integrated additional functions, for example embedded LEDs as a visualization function or as activatable markings.

The term "LED" is used synonymously below for any desired type of activatable optical marking. Depending on the selected expansion stage, the LEDs can be organized in this case as LED strips and/or as an LED matrix (also see FIG. 1 which is also explained in detail below). The primary function of the LEDs is, on the one hand, the marking of pathways for human workers (cf. also FIG. 2 which is also explained in detail below, where such a raised floor is shown). Additionally or alternatively, the LEDs can be used as a dynamic track guidance system for track-guided driverless transport systems. Such driverless transport systems can be referred to and considered as objects which are moved on the raised floor.

LED lights (activatable markings) below the driverless transport system are preferably activated in a defined color sequence or preferably emit light there such that the driverless transport system experiences both direction and acceleration control. The activatable markings are therefore used to transmit control information to the driverless transport system.

The optically activatable markings (LEDs) are preferably used to send information to objects on the raised floor (for example a driverless transport system) regarding which of the objects (driverless transport system) are used to avoid collisions.

Beyond the controller of the driverless transport system (of the objects), the LEDs of the intelligent floor can be used to send information relating to the intended route to further agents in the *Factory of the Future* (workers, autonomous robots, further vehicles), so that they can adapt their behavior thereto.

In addition to the pure route information, the safety distance to be complied with can also be visualized, with the result that this safety distance can be kept clear and the driverless transport system can move without an emergency stop. This method for visualizing the intended route is the content of the present disclosure.

So that the intelligent raised floor can visualize the movement/trajectory of an object/driverless transport system as accurately and error-free as possible, the following prerequisites should be complied with:

1. The raised floor or a central controller, to which the raised floor elements of the raised floor are connected, knows the current position of the object/driverless transport system.
2. The floor or the central controller knows the predefinable safety distances or safety distances to be complied with and dimensions of the object/driverless transport system.
3. The floor or the central controller knows the route/movement/trajectory to be traveled on the basis of the current position in its spatial and temporal form (when the mobile unit will be where).

The current position of the object/driverless transport system can be determined, for example, directly via the intelligent floor (sensors installed in the latter) and/or via external localization systems (for example additional position monitoring system).

The safety distances to be complied with can be stored in a central database and/or made available to a floor controller (grid controller or central control device) and/or are directly transmitted to the grid controller by the driverless transport system.

Figure 3:
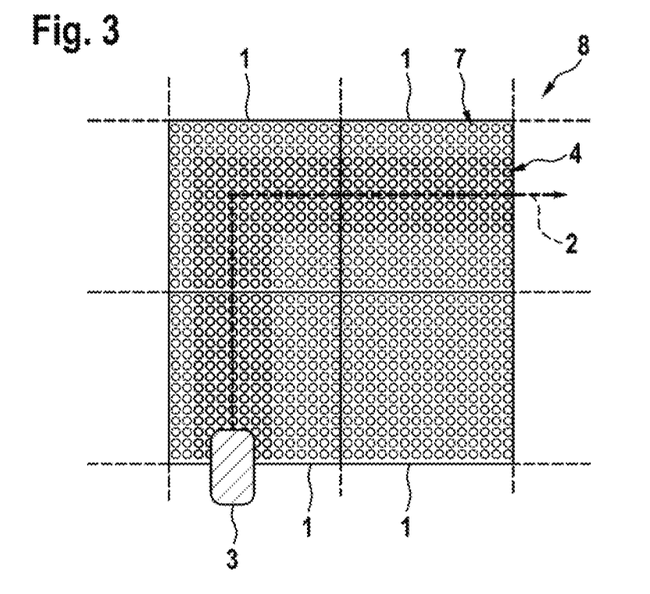
FIG. 3: shows an exemplary planned movement of an object in the method.

The route (trajectory or "planned movement") to be currently traveled can be communicated to the intelligent floor either by means of a central fleet management unit or likewise directly by the object/driverless transport system (step a)). Supplied with this information, the intelligent floor can visualize the route and/or safety distance, as illustrated in FIG. 3 which is also explained in detail below. The safety distance (step b)) can be determined for particular objects/driverless transport systems, for example, and/or can be taken from a database or calculated. The safety area can be determined from the planned movement and/or a safety distance.

The same method can also be used for stationary units, for example industrial robots and machines. In this case, the stationary unit communicates the required safety distance, but not a trajectory. As a result, the safety distance is visualized only for the current position of the unit. Changes in the working area of the robot can also be dynamically achieved and visualized by adapting the safety distance to be complied with.

If a plurality of mobile units are moving on the intelligent floor or if stationary units are too close together, the safety distances may overlap. The intelligent floor detects this by virtue of the fact that LEDs assigned to a unit are already required by another unit.

In the case of stationary units (objects which are not moved), this conflict cannot be resolved, the potential collision is escalated and reported back to the user.

In the case of overlapping trajectories, a check is now carried out in order to determine whether the assignment conflict also exists when taking into account the temporal sequence. That is to say, for example, whether the mobile units which are in conflict occupy the relevant area at the same time. This is expressed, in particular, in step c). This is illustrated below, by way of example, in FIG. 4 and is also explained.

If the conflict can be temporally resolved, the mobile unit arriving earlier is given priority and its trajectory is accordingly primarily visualized. As soon as the unit has passed, the relevant area is adjusted to the next trajectory.

If both mobile units arrive in the conflict area at the same time, the floor can decide which unit has priority according to fixed priority rules or according to stored heuristics. The visualization of the floor is accordingly adapted and the decision is returned to the unit (also see FIG. 4 which is also explained in detail below).

As already described further above, an already planned movement of an object can also be adapted in a step e) if an overlap was detected in step c).

An additional safety feature arises in the case of track-guided mobile units: the visual track which is normally followed by the unit is overwritten by the visualization of the other trajectory and the unit must remain outside the safety area until the path becomes free and its trajectory is displayed.

If a conflict cannot be resolved, the intelligent floor escalates and warns the user. In order to avoid a potential collision, visual warnings are additionally displayed in the collision area.

In addition, the intelligent floor can also track autonomously controlled mobile units (normal vehicles, workers) via the installed sensor system and can extrapolate a probable trajectory for the next short period therefrom. The intelligent floor monitors this extrapolated trajectory in a similar manner to the method described here and can therefore also warn of potential collisions, in particular in areas which are difficult to see, for instance at corners, in narrow corridors, etc.

In step d), a signal relating to the safety area is output using activatable markings on the at least one floor element. Activatable markings may be, for example, LEDs which have already been described above. In one embodiment, such markings (LEDs) can be used to display, for example, the safety distance around the object at its current position. In further embodiments, it is also possible for not only the safety distance around the object at the current position to be displayed, but rather for an area which is crossed by the safety area of the object during the planned movement of the object (along the trajectory) to be displayed along the planned movement/trajectory. This area can also be referred to as a "crossed or driven-over" safety area.

Provision may also be made for priorities to be assigned to at least two objects and to be taken into account when adapting movements in step e).

It was already described further above that the method can resort to stored priority rules. Stored priority rules can be stored, in particular, in a (possibly superordinate) control device. They are used to avoid collisions between the objects. They may occur if a plurality of objects (at least two objects) are moved on the raised floor. Priorities can be used to stipulate, for example, that the movement of particular objects has priority and other objects are subordinate or are subordinately moved. In order to avoid collisions, the planned movements or the planned movements/trajectories of lower-priority objects are changed, while the planned movements/trajectories of high-priority objects are retained.

Within the scope of step d), optically activatable markings can be used to output a control signal which can be received by a moving object.

This means, for example, that activatable markings (for example LEDs) can be used to provide moving objects with information. In particular, information relating to the intended route (planned movement/trajectory) can be transmitted to objects. Objects which are moved on the floor preferably have interfaces for receiving information via such interfaces. These may be, for example, optical sensors which can be used to detect activatable markings at/on the floor or at/on the floor elements. Data which are intended to be transmitted to objects can be coded using the activatable markings in a similar manner to an electronic barcode or a QR code. For transmission to objects, data can also be transmitted as (frequency-coded) flashing signals. The appropriate logic for evaluating data transmitted in this manner is preferably stored in the objects.

In preferred embodiment variants, a moving object adapts a movement (currently taking place) in response to a control signal.

The method is particularly advantageous if safety areas determined in step b) are temporally variable and are determined over an operating period and overlaps are checked in step c) in a temporally variable manner within the operating period.

A temporal variability of safety areas describes, in particular, the fact that the safety areas do not always have to be spatially at the same location when carrying out the described method/during the operating period, but rather are moved or migrate (in particular together with the moving objects). The safety area of a first object at a first time can therefore spatially overlap the safety area of a second object without a collision being detected if this spatial overlap is not associated with a temporal overlap. An overlap which corresponds to the detection of a (possible) collision is present only if there is both a temporal overlap and a spatial overlap (of the routes of a plurality of objects).

It is also preferred if, in step d), at least one warning signal is output if at least one overlap was detected in step c).

A warning signal may be optical. Such a warning signal can then be output, for example, using the activatable markings directly on the floor or on the raised floor elements, for example by highlighting the activatable markings with a special color. Alternatively or additionally, a warning signal can also be represented by means of symmetrical or asymmetrical flashing at constant or variable intervals of time. This is achieved, for example, by increasing the flashing frequency as the distance to the collision point becomes smaller.

A warning signal can be (alternatively or additionally) acoustic. An example here would be a warning tone which is used to alert a (human) supervisor monitoring the operation of the raised floor to the collision or the possible collision as a result of the overlap.

In yet further embodiment variants, the warning signal can also comprise a purely electronic signal (data signal) which is possibly emitted to a superordinate control unit which suitably carries out actions for operating the raised floor.

In this case, the intention is also to describe a particularly preferred raised floor element which can be used to construct a floor which is particularly suitable for operation according to the method described here. It is particularly preferred if the raised floor element has an upper floor panel, at least one functional element which can be actuated by a control device, and at least one connecting element for connection to at least one further raised floor element, wherein the functional element is a row or a matrix of activatable markings which can be used to indicate an area on the raised floor element.

It is also preferred if activatable markings comprise light-emitting means.

It is also preferred if at least one sensor is in the form of a functional element, which sensor is configured, in particular, to capture objects and particularly preferably to capture movements of objects.

A raised floor comprising described raised floor elements, which is configured, in particular, for operation according to a described method, is also preferred.

In one exemplary use of the method, a vehicle travels according to a path plan across the hall floor which is a raised floor comprising raised floor elements, as described here. The trajectory of the vehicle which is planned or intended by the vehicle controller is transmitted to the floor controller (central or in the individual tile/raised floor element) and is presented there. In this case, a safety area to be kept clear in front of the vehicle in the direction of travel, in particular, is especially highlighted. This prevents a worker from running into the path, for example, and causing the vehicle to carry out an emergency braking operation. In addition, the floor can reserve the displayed track for a vehicle and can release it for a further vehicle only after passage. It is therefore proposed here, in particular, that a vehicle travels across an "intelligent" hall floor according to a path plan. The (possibly abstracted) method steps proposed here can be implemented as a computer-implemented method. It is therefore also possible to implement a data processing system which has means for carrying out the (possibly abstracted) method steps proposed here.

BRIEF DESCRIPTION OF THE DRAWINGS

The described method and the described raised floor element as well as the raised floor constructed from the latter are explained in more detail below on the basis of the figures. The figures describe particularly preferred exemplary embodiments, but the method, raised floor element and raised floor are not limited thereto. In the drawings.

DETAILED DESCRIPTION

Figure 1A:
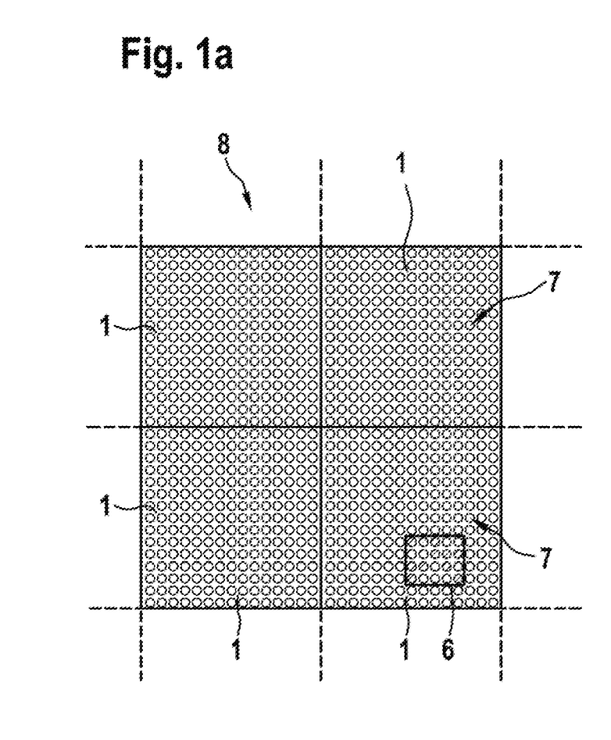
FIGS. 1a, 1b: show schematic illustrations of activatable markings on a raised floor element.
Figure 1B:
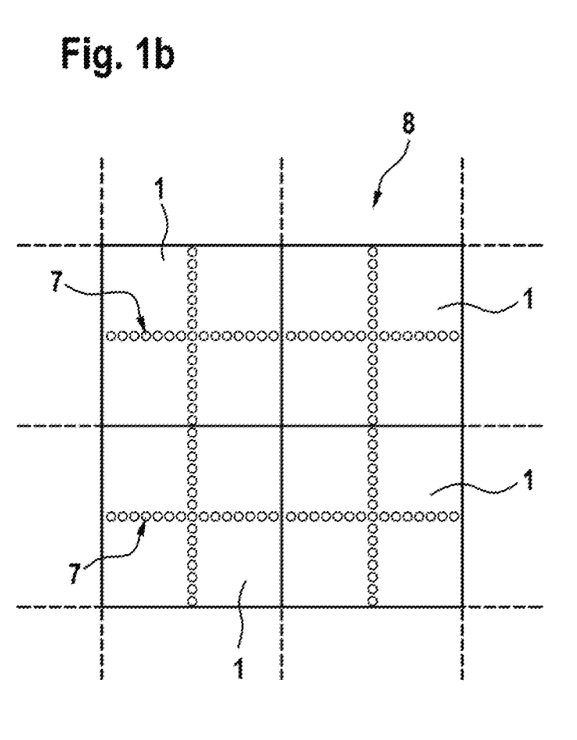

FIG. 1a and FIG. 1b show a schematic illustration of a raised floor 8 from above. Individual floor tiles which can be formed by floor elements 1, for example, can be seen here. Activatable markings 7 which may be in the form of LEDs, for example, can likewise be seen. In FIG. 1a, the activatable markings 7 are arranged in a matrix arrangement. In FIG. 1b, the activatable markings are arranged in a linear arrangement. The matrix arrangement of the activatable markings 7 in FIG. 1a enables a very free presentation of safety areas on the raised floor. The presentation possibilities with the activatable markings according to FIG. 1b are somewhat more restricted. In this case, surface areas of the surface of the raised floor 8, in particular, which are surrounded or enclosed by the lines formed with the activatable markings can be marked as a safety area. FIG. 1 also illustrates, by way of example, that the activatable markings 7 can be used to output a signal 6 which can be read in by an object on the raised floor 8 using read-in means provided for this purpose. Such a signal 6 functions in a similar manner to a barcode, for example.

Figure 2:
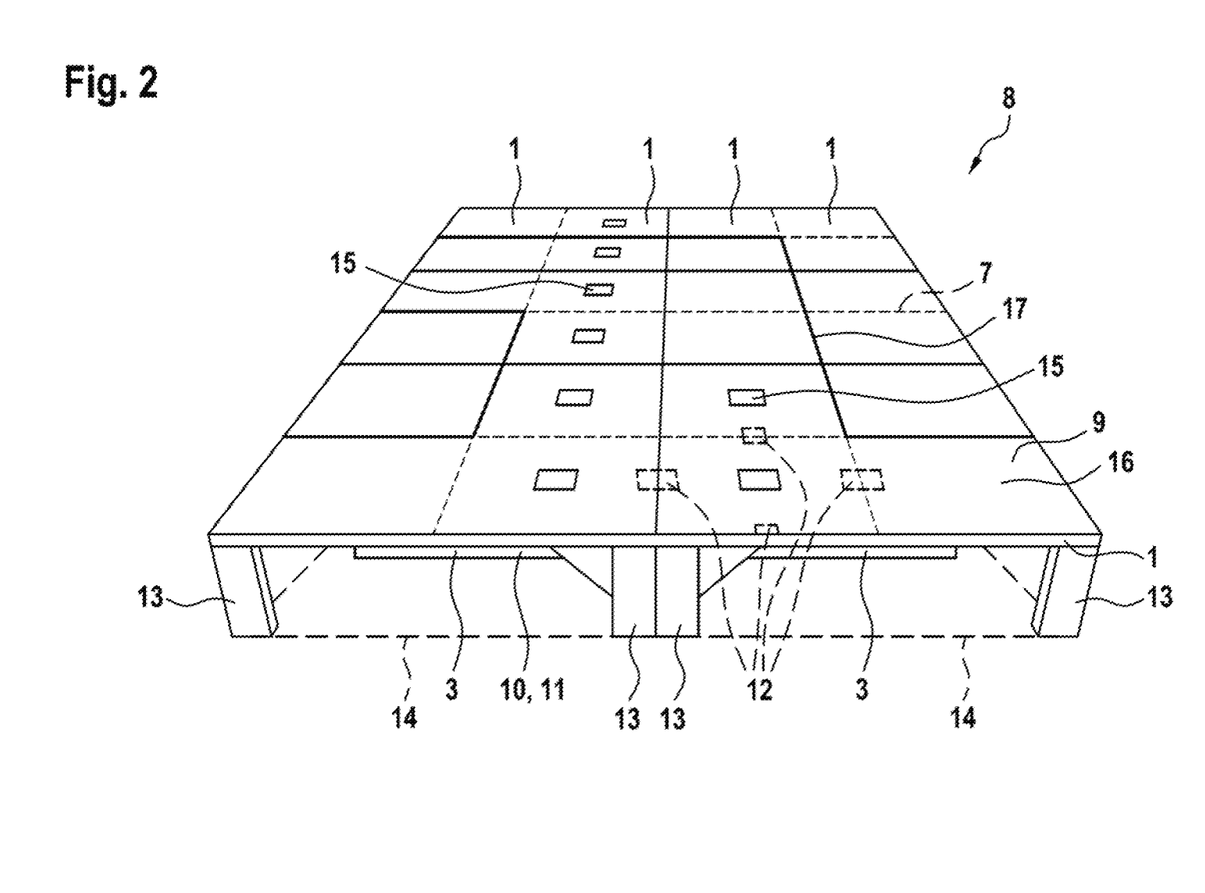
FIG. 2: shows a three-dimensional illustration of a raised floor element described.

FIG. 2 shows a three-dimensional illustration of a raised floor 8 comprising floor elements 1. The floor elements 1 each have a floor panel 9 which is arranged on supports 13, wherein the supports 13 predefine a distance to a subfloor 14 on which the floor elements 1 stand and on which they form the raised floor 8. According to FIG. 2, the activatable markings 7 are linear, as according to FIG. 1b as well. By way of example, it is shown how these activatable markings are used here to highlight a pathway 16. A sensor 15 is respectively depicted here, by way of example, on some floor elements 1 or on some floor panels 9. All floor elements 1 preferably have a sensor 15. Further components may be present on an underside of the floor panels 9, for example further functional elements 10 and/or control devices 11 assigned to the respective floor panels 9. By way of example, connecting elements 12 are also illustrated on a floor element 1 and are used to connect the floor element 1 to further floor elements 1 and, in particular, also enable a data connection of a control device 11 of the floor element 1 to a central control device 11 or to the control devices of further (in particular adjacent) floor elements 1.

FIG. 3 explains the visualization of a planned movement (or trajectory or driverless transport system route) on the raised floor 8 comprising the floor elements 1. The object 3 on the raised floor 8 and its planned movement 2/the trajectory can be seen. The safety area 4 is presented around the course of the planned movement 2 with the aid of activatable markings 7. The activatable markings 7 are arranged in a matrix arrangement. This enables a very free presentation of safety areas 4 on the raised floor 8. The planned movement 2 and/or the safety area 4 is/are visualized by means of the activatable markings 7. The visualization with the activatable markings 7 can also be simultaneously used to transmit the course of the planned movement 2 to the object 3.

Figure 4:
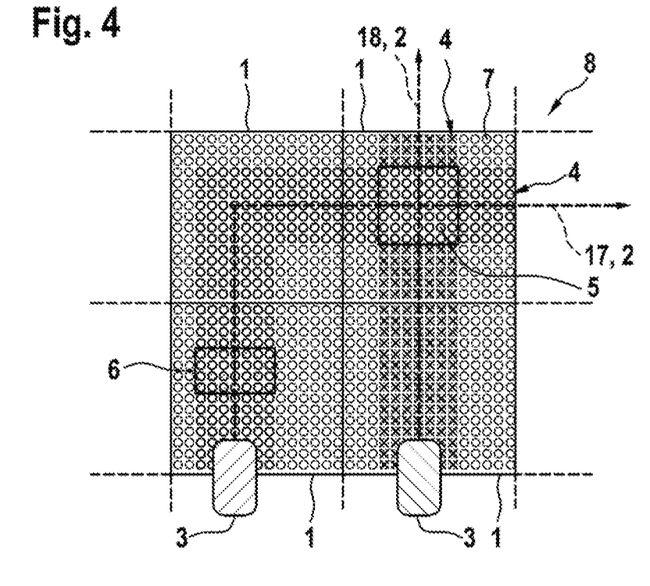
FIG. 4: shows two exemplary planned movements of objects in the method with an overlap.

The example from FIG. 3 is extended in FIG. 4 by virtue of the fact that two objects 3 with their planned movements 2 and their safety area 4 are presented on the raised floor 8 and are explained. It can be seen that a planned movement 2/trajectory respectively exists here for each object 3, in which case there is a primary planned movement 17/trajectory and a secondary planned movement 18/trajectory. Safety areas 4 with an overlap 5 respectively exist for both planned movements 2, 17 and 18. In such a case, it would now be necessary to carry out a step e) in order to adapt the secondary planned movement 18 of the corresponding object 3, so that the overlap 5 no longer occurs. FIG. 4 also illustrates, by way of example, a signal 6 which can be used to transmit data from the raised floor 8 to an object 3 on the raised floor 8.

Figure 5:
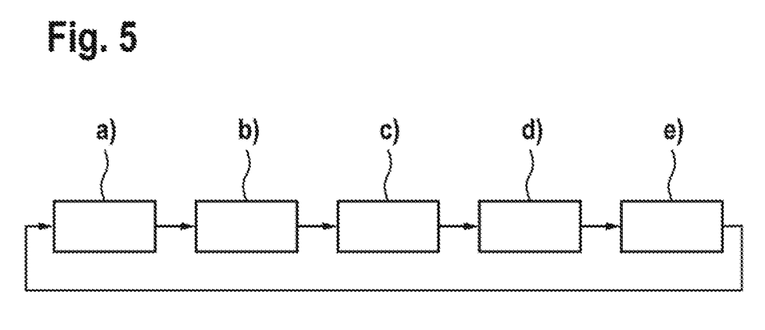
FIG. 5: shows a flowchart of the described method.

FIG. 5 shows a flowchart of the described method. Method steps a) to e) which can be iteratively repeated in the manner of a loop can be seen.

LIST OF REFERENCE SIGNS

1 Floor element
2 Planned movement
3 Object
4 Safety area
5 Overlap
6 Signal
7 Activatable marking
8 Raised floor
9 Floor panel
10 Functional element
11 Control device
12 Connecting element
13 Support
14 Subfloor
15 Sensor
16 Pathway
17 Primary planned movement
18 Secondary planned movement

The invention claimed is:

1. A method for operating at least one floor element, the method comprising:
receiving at least one planned movement of at least one object of a plurality of objects located on at least one floor element;
determining a respective safety area on the at least one floor element for each object in the plurality of objects;
detecting whether there is an overlap between the respective safety areas for objects of the plurality of objects; and
operating activatable markings on the at least one floor element based on the respective safety area of at least one object of the plurality of objects.

2. The method according to claim 1, further comprising:
adapting at least one planned movement of a first object of the plurality of objects in response to detecting the respective safety area of the first object overlaps the respective safety area of a second object of the plurality of objects.

3. The method according to claim 2, wherein the method is iteratively carried out in a loop and the method is restarted after the adapting of the at least one planned movement of the first object.

4. The method according to claim 2, further comprising:
assigning priorities to at least two objects of the plurality of objects, wherein the adapting of the at least one planned movement further comprises adapting the at least one planned movement of the first object based on includes taking the assigned priorities.

5. The method according to claim 1, the operating the activatable markings further comprising:
   operating optically activatable markings on the at least one floor element to output a control signal that is receivable by a moving object of the plurality of objects.

6. The method according to claim 5, wherein the control signal is configured to cause the moving object to adapt its movement.

7. The method according to claim 1, wherein:
   the respective safety area of at least object of the plurality of objects is temporally variable on the at least one floor element and is determined over an operating period; and
   the detecting whether there is an overlap is performed in a temporally variable manner within the operating period.

8. The method according to claim 1, the operating the activatable markings further comprising:
   operating the activatable markings to output at least one warning signal at least one warning signal in response to detecting an overlap between the respective safety areas for objects of the plurality of objects.

9. A method for operating at least one floor element, the method comprising:
   receiving at least one planned movement of at least one object of a plurality of objects located on at least one floor element;
   determining a respective safety area on the at least one floor element for each object in the plurality of objects;
   detecting whether there is an overlap between the respective safety areas for objects of the plurality of objects;
   operating activatable markings on the at least one floor element based on the respective safety area of at least one object of the plurality of objects; and
   adapting at least one planned movement of a first object of the plurality of objects in response to detecting the respective safety area of the first object overlaps the respective safety area of a second object of the plurality of objects.

* * * * *

UNITED STATES PATENT AND TRADEMARK OFFICE
CERTIFICATE OF CORRECTION

PATENT NO. : 11,249,483 B2
APPLICATION NO. : 16/826859
DATED : February 15, 2022
INVENTOR(S) : Ewert et al.

Page 1 of 1

It is certified that error appears in the above-identified patent and that said Letters Patent is hereby corrected as shown below:

In the Claims

Claim 7, Column 9, Line 15: "at least object" should read --at least one object--.

Claim 8, Column 10, Lines 1-2: "to output at least one warning signal at least one warning signal in response" should read --to output at least one warning signal in response--.

Signed and Sealed this
Fifth Day of July, 2022

Katherine Kelly Vidal
*Director of the United States Patent and Trademark Office*